United States Patent [19]

Lindskog

[11] 3,807,007
[45] Apr. 30, 1974

[54] TOOL HOLDER

[75] Inventor: Bo Gosta Lindskog, Sandviken, Sweden

[73] Assignee: Sandvik Aktiebolag, Sandviken, Sweden

[22] Filed: Nov. 16, 1972

[21] Appl. No.: 307,098

[30] Foreign Application Priority Data
Dec. 6, 1971  Sweden.................................. 15616

[52] U.S. Cl. ................................................... 29/96
[51] Int. Cl............................................. B26d 1/00
[58] Field of Search.................................. 29/96, 95

[56] References Cited
UNITED STATES PATENTS
3,409,964  11/1968  Jessop..................................... 29/96
3,488,822  1/1970  Jones...................................... 29/96

*Primary Examiner*—Leonidas Vlachos
*Attorney, Agent, or Firm*—Pierce, Scheffler & Parker

[57] ABSTRACT

For affixing a cutting insert in a toolholder of the type in which a pin is used to lock the insert in position, added clamping force is provided by a conically headed screw member adapted to move the pin sidewise upon inward rotation of the screw member.

3 Claims, 5 Drawing Figures

PATENTED APR 30 1974 3,807,007

TOOL HOLDER

This invention relates to a toolholder for detachably affixing a cutting insert thereto by means of a locking pin that acts as a lever and enters into an aperture in the insert.

Various toolholders are already known in which the cutting insert is clamped in an insert site by means of a pin which enters into an aperture in the insert, adjustable means being arranged to engage the opposite end of said pin so as to turn it about its pivot thereby urging the insert against an abutment on the holder. To a remarkable extent, however, such holders are unnecessarily complicated comprising clamping means that occupy an appreciable area towards the extremity of the holder thereby impairing the accessibility. Furthermore, there has been a tendency for the insert to come apart from its site in such holders when being in cutting engagement due to insufficient clamping force exerted thereon.

It is the object of the present invention to provide a new and improved tool holder which alleviates the abovementioned disadvantages. The new holder according to this invention has been found to exert a surprisingly great clamping force upon the insert while at the same time providing improved accessibility, e.g., in copying operations.

This, and other, inventive objects are realized in accordance with the invention, by providing a tool holder of the aforementioned type which is characterized in that a screw member is threadably received beside the pin in the holder, with the longitudinal axis of said screw member oriented essentially parallel to that of the pin-receiving bore in the holder, the head of said screw member being substantially conical in shape and adapted to be received in a bore while simultaneously engaging into a correspondingly formed recess on said pin, so that the tilt pin is moved sideways upon rotation of said screw member to bring the insert firmly against the wall portion of the site in the holder. The invention will now be more specifically described below, with reference to the accompanying drawing, in which FIG. 1 is an elevational top view of a tool holder provided with means for securing a cutting insert in position, in accordance with one embodiment of the invention;

Figure 1:
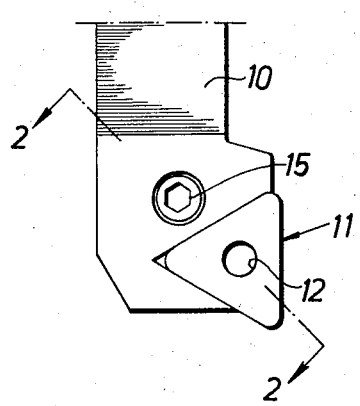
Figure 2:
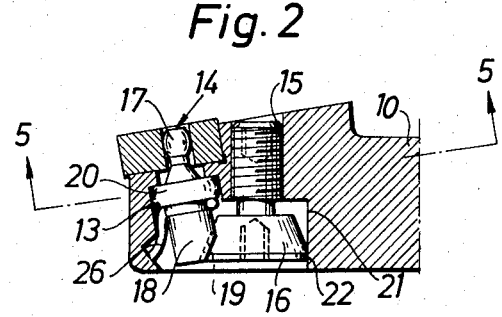
FIG. 2 is a section, taken on line 2—2 in FIG. 1, of a tool holder according to the invention.
Figure 3:
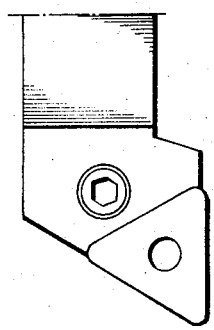
FIG. 3 is a plan view of an alternative embodiment of a tool holder of the invention.
Figure 4:
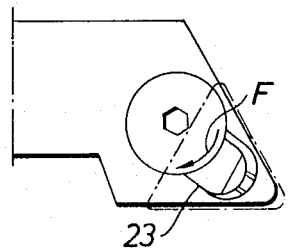
Figure 5:
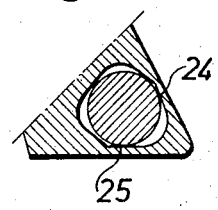

FIG. 4 is a view from the underneath side of the tool holder shown in FIG. 3; and FIG. 5 is a detailed sectional view taken on the line 5—5 in FIG. 2 but relating to the alternative embodiment of FIGS. 3 and 4. Referring to FIGS. 1 to 3, a toolholder comprises a shank 10 formed at one end with a site to receive a cutting insert 11. In the embodiment shown in FIG. 1 the site is formed as a pocket for the reception of a cutting insert of triangular form having a bore 12 therethrough. It is to be understood, however, that the present invention is useful with all types of inserts of the conventional type. A bore 13 adjoins the insert-receiving site, wherein a pin 14 is arranged to function as a double-armed lever by actuating means comprising a screw member 15 with a conically shaped head 16 which screw member is threadably received in the holder beside pin 14.

Referring now to FIG. 2, pin 14 is disposed in seating engagement in bore 13. Pin 14 extends to bore 12 and terminates in a ball-like end-portion 17 of reduced diameter which fits relatively closely in bore 12 extending through insert 11. The lowermost part 18 of the pin is substantially cylindrical in shape; or, it may be slightly tapered. Bewteen its end portions 17 and 18 the pin 14 is provided with an enlarged collared section 20 adapted to be received, with relatively close fit, in a section of enlarged diameter of bore 13.

The conically shaped head 16 of screw member 15 is adapted to be received in a subatantially cylindrical bore 21 while simultaneously engaging into a conical recess 19 on the lowermost part 18 of said pin 14, which recess 19 corresponds to the shape of said concial head 16 on screw member 15. The longitudinal axis of screw member 15 should be parallel to that of bore 13 or slightly inclined in relation thereto.

For facilitating easy indexing of the insert, screw member 15 has polygonal key grips at both ends thereof for turning and clamping. The part 22 of screw member 15 which is disposed to engage into bore 21 is cylindrically shaped for bearing against it, so that the turning moment can be partly absorbed thereof and so that loosening thereof can be accomplished lightly when unscrewing said screw member 15. In order to give pin 14 return movement and to maintain its bearing against head 16 when unscrewing screw member 15, pin 14 is provided with a spring member 26 as appears from FIG. 2.

The embodiment shown in FIG. 3-5 is similar to the sbove-described embodiment; it differs therefrom only in that a plane straight surface is the only lateral abutment for the cutting insert against which only one of the lateral surfaces of the triangular insert abutts. In order to keep pin 14 steered in one plane, the tool holder in this embodiment is provided with a straight plane side abutment surface 23 as shown in FIG. 4, the lowermost part of pin 14 being urged against said side abutment 23 while the collared section 20 simultaneously being urged against two points or surfaces 24 and 25 in that portion of the pin-receiving bore 13 which is enlarged complementarily to said collared section 20 such as shown in FIG. 5. When turning screw 15 the friction force "F" acting in the direction of the arrow as shown in FIG. 4 keeps the pin 14 urged sideways against side abutment 23.

As will be understood from the above specification, locking of the cutting insert in the site is obtained by turning screw member 15 until the head 16 thereof is brought into locking engagement with the lowermost correspondingly recessed part 18 of the pin so that cutting insert 11 is firmly secured on its site and is locked in position thereon. In this way pin 14 is tiltably supported within bore 13, with its fulcrum at that point whereat the intermediate collared section 20 thereof abutts against that wall portion of the pin-receiving bore which is enlarged compementarily to said collared section. Due to the tilting of the pin, the insert is forced against the lateral wall portion of the site in the holder.

I claim:

1. A tool holder having in one end thereof a site to receive an apertured cutting insert, said site having at least one lateral wall;

a first bore through said holder;

a tilt pin, received in said first bore, acting as a lever which is disposed to engage in said aperture;

a second bore, through said holder, the longitudinal axis of which is substantially parallel to that of said first bore; and a screw member threadably received in a threaded part of said second bore and having both of its ends accessible for rotational movement of said screw member, said screw member having a generally conical head adapted to be received in a substantially cylindrical portion of said second bore while simultaneously engaging into a recess in the end portion of said tilt pin which recess corresponds to the shape of said conical head on said screw member, so that the tilt pin is moved sideways upon rotation of the screw member to bring the cutting insert firmly against the wall portion of the site of the tool holder.

2. A tool holder as claimed in claim 1, wherein the head of said screw member comprises a cylindrical portion adjacent to the conical portion thereof adapted to engage in said substantially cylindrical bore to enable easy loosening thereof from said bore when unscrewing said screw member.

3. A tool holder as claimed in claim 1, wherein the tilt pin is steered in one plane during its lever action by provision of a straight side abutment surface in the tool holder, the lowermost part of the tilt pin being urged against said side abutment, during the lever action while a collared section of said tilt pin is urged against two points or surfaces in that portion of the pin-receiving bore which is enlarged complementarily to said collared section.

* * * * *